(12) United States Patent
Chen

(10) Patent No.: US 11,303,763 B1
(45) Date of Patent: Apr. 12, 2022

(54) COMPENSATION METHOD FOR EXTRUSION SPEED OF 3D PRINTER

(71) Applicant: SHANGHAI CONTOUR TECHNOLOGY CO., LTD., Shanghai (CN)

(72) Inventor: Zihan Chen, Shanghai (CN)

(73) Assignee: SHANGHAI CONTOUR TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/401,946

(22) Filed: Aug. 13, 2021

(30) Foreign Application Priority Data

May 10, 2021 (CN) .......................... 202110506211.2

(51) Int. Cl.
| | |
|---|---|
| *H04N 1/00* | (2006.01) |
| *B33Y 50/02* | (2015.01) |
| *B29C 64/393* | (2017.01) |
| *B29C 64/106* | (2017.01) |
| *B33Y 30/00* | (2015.01) |

(52) U.S. Cl.
CPC ....... *H04N 1/00087* (2013.01); *B29C 64/106* (2017.08); *B29C 64/393* (2017.08); *B33Y 50/02* (2014.12); *H04N 1/00018* (2013.01); *H04N 1/00031* (2013.01); *H04N 1/00045* (2013.01); *B33Y 30/00* (2014.12)

(58) Field of Classification Search
None
See application file for complete search history.

(56) References Cited

U.S. PATENT DOCUMENTS

| | | |
|---|---|---|
| 2017/0312987 A1 | 11/2017 | Ladanyi |
| 2018/0093420 A1 | 4/2018 | Roberts et al. |
| 2018/0264751 A1 | 9/2018 | Tran et al. |

FOREIGN PATENT DOCUMENTS

| | | |
|---|---|---|
| CN | 107187058 A | 9/2017 |
| CN | 108971424 A | 12/2018 |
| CN | 110281345 A | 9/2019 |
| CN | 110605854 A | 12/2019 |
| CN | 111194265 A | 5/2020 |
| CN | 111347666 A | 6/2020 |

(Continued)

OTHER PUBLICATIONS

Tronvoll, Sigmund & Popp, Sebastian & Elverum, Christer & Welo, Torgeir. (2019). Investigating pressure advance algorithms for filament-based melt extrusion additive manufacturing: theory, practice and simulations. Rapid Prototyping Journal, ahead-of-print. 10.1108/RPJ-10-2018-0275.

*Primary Examiner* — Scott A Rogers
(74) *Attorney, Agent, or Firm* — Veros Legal Solutions, LLP

(57) ABSTRACT

A compensation method for a 3D printer is provided. The 3D printer includes an extruder and a detection device. The method includes causing the extruder to print a test pattern based on a preset printing scheme, wherein the preset printing scheme specifies that the extruder moves at at least two movement speeds during extrusion of materials to print the test pattern; detecting, using the detection device, an extrusion speed characteristic of the extruder from the test pattern; and determining, based on the detected extrusion speed characteristic, a compensation coefficient for compensating an extrusion speed of the extruder.

18 Claims, 14 Drawing Sheets

(56) References Cited

FOREIGN PATENT DOCUMENTS

| | | | |
|---|---|---|---|
| CN | 108312496 B | | 8/2020 |
| CN | 211994251 U | | 11/2020 |
| KR | 20180118359 A | * | 10/2018 |
| KR | 102003256 B1 | * | 7/2019 |
| WO | 2016004641 | | 1/2016 |

* cited by examiner

COMPENSATION METHOD FOR EXTRUSION SPEED OF 3D PRINTER

CROSS REFERENCE TO RELATED APPLICATIONS

This application claims priority to Chinese Patent Application No. CN202110506211.2, filed on May 10, 2021, the contents of which are hereby incorporated by reference in their entirety for all purposes.

TECHNICAL FIELD

The present disclosure relates to the field of three-dimensional (3D) printing technology, and in particular to a compensation method and compensation apparatus for a 3D printer, a control method and a control apparatus for a 3D printer, a 3D printer, a computer readable storage medium, and a computer program product.

BACKGROUND

A 3D printer, also known as a three-dimensional printer, is a kind of process equipment for rapid prototyping, which is usually realized by using digital technology to print materials. 3D printers are often used to manufacture models or parts in fields such as mold manufacturing and industrial design. In recent years, 3D printing technology has demonstrated high applicability in jewelry, footwear, industrial design, architecture, engineering and construction (AEC), automotive, aerospace, dental and medical industries, education, geographic information systems, civil engineering, guns and other fields.

The compensation technology of 3D printers is very important to the further development of 3D printing technology. At present, there is still a lot of room for improvement in the compensation technology of 3D printers.

The methods described in this section are not necessarily those that have been previously conceived or adopted. Unless otherwise specified, it should not be assumed that any of the methods described in this section are considered prior art simply because they are included in this section. Similarly, unless otherwise specified, the problems mentioned in this section should not be considered recognized in any prior art.

SUMMARY

The present disclosure provides a compensation method and a compensation apparatus for a 3D printer, a control method and a control apparatus for a 3D printer, a 3D printer, a computer-readable storage medium, and a computer program product.

According to an aspect of the present disclosure, a compensation method for a 3D printer is provided. The 3D printer comprises an extruder and a detection device. The method comprises: causing the extruder to print a test pattern based on a preset printing scheme, wherein the preset printing scheme specifies that the extruder moves at at least two movement speeds during extrusion of materials to print the test pattern; detecting, using the detection device, an extrusion speed characteristic of the extruder from the test pattern; and determining, based on the detected extrusion speed characteristic, a compensation coefficient for compensating an extrusion speed of the extruder.

According to another aspect of the present disclosure, a method for controlling a 3D printer is provided. The 3D printer comprises an extruder. The method comprises: acquiring a desired extrusion speed of the extruder; and causing materials of an amount corresponding to the desired extrusion speed to be supplied to the extruder according to a compensation coefficient, wherein the compensation coefficient is obtained by the method according to any compensation method as described above.

According to another aspect of the present disclosure, a 3D printer is provided, comprising: an extruder; a detection device; and a processor configured to execute instructions to implement any method as described above.

According to another aspect of the present disclosure, a compensation apparatus for a 3D printer is provided. The 3D printer comprises an extruder and a detection device. The apparatus comprises: a driving module configured to cause the extruder to print a test pattern based on a preset printing scheme, wherein the preset printing scheme specifies that the extruder moves at at least two movement speeds during extrusion of materials to print the test pattern; a detection module configured to detect, using the detection device, an extrusion speed characteristic of the extruder from the test pattern; and a determining module configured to determine, based on the detected extrusion speed characteristic, a compensation coefficient for compensating an extrusion speed of the extruder.

According to another aspect of the present disclosure, a control apparatus for a 3D printer is provided. The 3D printer comprises an extruder. The apparatus comprises: an acquisition module configured to acquire a desired extrusion speed of the extruder; and a compensation module configured to cause materials of an amount corresponding to the desired extrusion speed to be supplied to the extruder according to a compensation coefficient, wherein the compensation coefficient is obtained by any compensation method as described above.

According to another aspect of the present disclosure, a non-transitory computer-readable storage medium having instructions stored thereon is provided. The instructions are to cause the 3D printer as described above to execute the method as described above.

According to another aspect of the present disclosure, a computer program product is provided, comprising instructions to cause the 3D printer as described above to execute the method as described above.

According to one or more embodiments of the present disclosure, it is possible to realize the automation of 3D printer compensation and lower the threshold for obtaining improved 3D printing effects.

It should be understood that the content described in this section is not intended to identify key or important features of the embodiments of the present disclosure, nor is it intended to limit the scope of the present disclosure. Other features of the present disclosure will be easily understood through the following description.

BRIEF DESCRIPTION OF THE DRAWINGS

The accompanying drawings show the embodiments and constitute a part of the specification, and are used to explain exemplary implementations of the embodiments together with the written description of the specification. The illustrated embodiments are for illustrative purposes only and do not limit the scope of the claims. In all the drawings, like reference signs refer to similar but not necessarily the same elements.

DETAILED DESCRIPTION OF THE EMBODIMENTS

Figure 1:
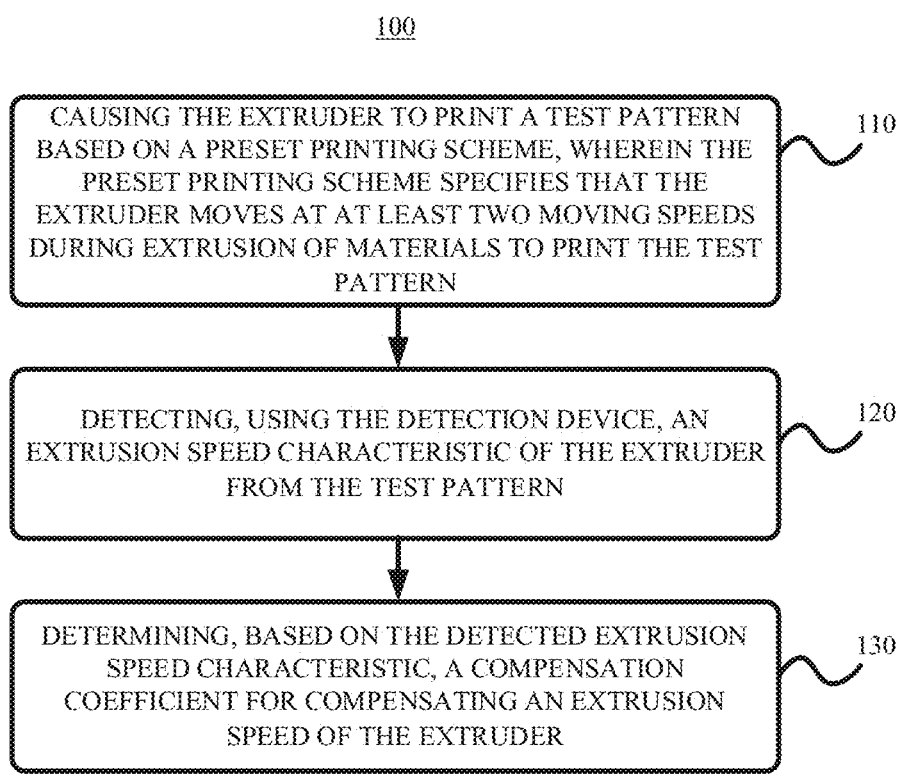
FIG. 1 shows a flowchart of a compensation method of a 3D printer according to an embodiment of the present disclosure.

The following describes example embodiments of the present disclosure with reference to the accompanying drawings, which include various details of the embodiments of the present disclosure to facilitate understanding, and should be regarded as merely exemplary. Therefore, those of ordinary skill in the art should recognize that various changes and modifications can be made to the embodiments described herein without departing from the scope of the present disclosure. Likewise, for clarity and conciseness, descriptions of well-known functions and structures are omitted in the following description.

In the present disclosure, unless otherwise specified, the use of the terms "first", "second", etc. to describe various elements is not intended to limit the positional relationship, timing relationship, or importance relationship of these elements. Such terms are only used for distinguish one element from another. In some examples, the first element and the second element may refer to the same instance of the element, and in some cases, based on the description of the context, they may also refer to different instances.

The terms used in the description of the various examples in this disclosure are only for the purpose of describing specific examples, and are not intended to be limiting. Unless the context clearly indicates otherwise, if the number of elements is not specifically limited, there may be one or more elements. In addition, the term "and/or" used in the present disclosure covers any one of the listed items and all possible combinations.

In fused deposition type 3D printing, the feeding process inside the extruder is not completely rigid, but very flexible. This is because rapid changes in the flow rate of the extruded material are needed according to the movement speed of the extruder during the printing. For example, when moving at a right angle, the extruder quickly decelerates in an x-axis direction, and then accelerates quickly in a y-axis direction, during which the total movement speed will have a rapidly-changing process of fast->slow->fast. Correspondingly, the flow rate of the extruded material needs to be changed synchronously during this rapidly-changing process. When the extruder cannot achieve the desired change in the flow rate of the extruded material, it will cause a large amount of material to be accumulated and bulge in the low-speed zone of the movement, and a shortage of material in the high-speed zone of the movement that results in gaps.

In the related art, in view of the problem that the extruder cannot achieve the desired change in the flow rate of the extruded material, an additional feeding amount is usually supplied to the extruder according to the required extrusion speed in order to quickly increase the pressure of the hot melt cavity, thereby quickly increasing the extrusion speed. The additional feeding amount required for a certain extrusion speed is determined by a compensation coefficient. An appropriate compensation coefficient can effectively eliminate the phenomenon of bulging in the low-speed zone and lack of material in the high-speed zone.

The above method requires manual judgment and calculation of the compensation coefficient. Different types, manufacturers, batches of extrudates, and different printing temperatures and speeds will affect this compensation coefficient. If a user wants to obtain the best compensation effect, he or she needs to perform a manual measurement of the compensation coefficient before printing. This may be unacceptable for users.

Embodiments of the present disclosure realize automated measurement and determination of compensation coefficients by introducing the idea of automatic detection, thereby lowering the threshold for improving the effect of 3D printing.

The embodiments of the present disclosure will be described in detail below with reference to the accompanying drawings.

FIG. 1 shows a flowchart of a compensation method 100 of a 3D printer according to an embodiment of the present disclosure. As shown in FIG. 1, the compensation method 100 includes steps 110 to 130.

In step 110, the extruder is caused to print a test pattern based on a preset printing scheme specifying that the extruder moves at at least two movement speeds during extrusion of materials to print the test pattern.

In some embodiments, for determining the compensation coefficient, the extruder of the 3D printer may print a test pattern according to a preset printing scheme. The test pattern can be, for example, a straight line, a right angle, a curve, and the like. In some embodiments, the preset printing scheme may specify that the extruder moves at at least two different speeds. For example, the extruder may be controlled to move at a first movement speed for a first predetermined time/distance, and then continue to move for a second predetermined time/distance at a second movement speed different from the first movement speed. Different movement speeds correspond to different parts of the resulting test pattern. In this way, the obtained test pattern can indirectly reflect the amount of feeding material that needs to be compensated to the extruder when the movement speed of the extruder changes. It will be understood that the term "at least two movement speeds" as used herein may refer to the movement speeds of the extruder on a printing plane (e.g., a plane perpendicular to the material extrusion direction of the extruder). Further, the phrase "extruded material" may refer to a printing material extruded by the extruder that will adhere to an object such as a hot bed or a mold.

In step 120, an extrusion speed characteristic of the extruder is detected, using the detection device, from the test pattern. In some embodiments, the detection device may include a computer vision system (which may include an image capture device such as a camera) or a contour scanner. In some embodiments, the test pattern may extend along a predetermined path, and detecting the extrusion speed characteristic of the extruder from the test pattern includes detecting a cross-sectional characteristic representing a cross-sectional area of the test pattern on the predetermined path as the extrusion speed characteristic. With the movement speed of the extruder changing according to the preset printing scheme, the characteristics that reflect the change of the extruder's extrusion speed following the change of the movement speed can be obtained by the detection device automatically scanning the test pattern printed.

In some embodiments, the cross-sectional characteristic includes a cross-sectional area of the test pattern on the predetermined path or a width of a projection of the test pattern onto a printing plane on the predetermined path. In some embodiments, the printing plane may be a plane to which the extruded material of the printed test pattern is attached, for example, a plane perpendicular to the material extrusion direction of the extruder.

In some embodiments, the detection device (e.g., a contour scanner) may perform contour scanning of the test pattern, and record the contour line of the test pattern corresponding to each scanning point during the scanning process. The cross-sectional area represented by the contour line reflects the characteristics of the extrusion speed of the extruder at this scanning point. In one example, a detection device such as a contour scanner or a computer vision system can also be used to detect the test pattern to obtain the width of the projection of the test pattern onto the printing plane. In some embodiments, the width of the projection of the test pattern onto the printing plane can be directly approximated as the cross-sectional area at a corresponding position. In step 130, a compensation coefficient for compensating the extrusion speed of the extruder is determined based on the detected extrusion speed characteristic. In some embodiments, the extrusion speed characteristic extracted by the detection device can be used for automatic analysis to determine the compensation coefficient of the extruder required to improve the 3D printing quality.

In summary, in the compensation method 100, the test pattern contains information about the extrusion speed characteristic of the extruder which moves at changing movement speeds. The compensation method 100 can automatically detect such extrusion speed characteristics in the test pattern by means of the detection device, and perform analysis to determine the compensation coefficient. Since the compensation method 100 can realize the printing of the test pattern, the extraction of the extrusion speed characteristics, and the determination of the compensation coefficient, the technical operation difficulty for the user can be greatly reduced, and the threshold for the user to obtain improved 3D printing quality can be lowered.

In some embodiments, the test pattern may include at least one segment, and the preset printing scheme specifies that during the printing of each segment, the extruder moves at a first movement speed of the at least two movement speeds for a first duration and moves at a second movement speed of at least two movement speeds for a second duration immediately after the first duration. In some embodiments, the test pattern may include multiple segments, each segment itself being printed by a different movement speed. As will be described in more detail later, by printing multiple segments, the detected extrusion speed characteristics can be more accurate, thereby resulting in a better compensation coefficient and improved print quality.

Figure 2:
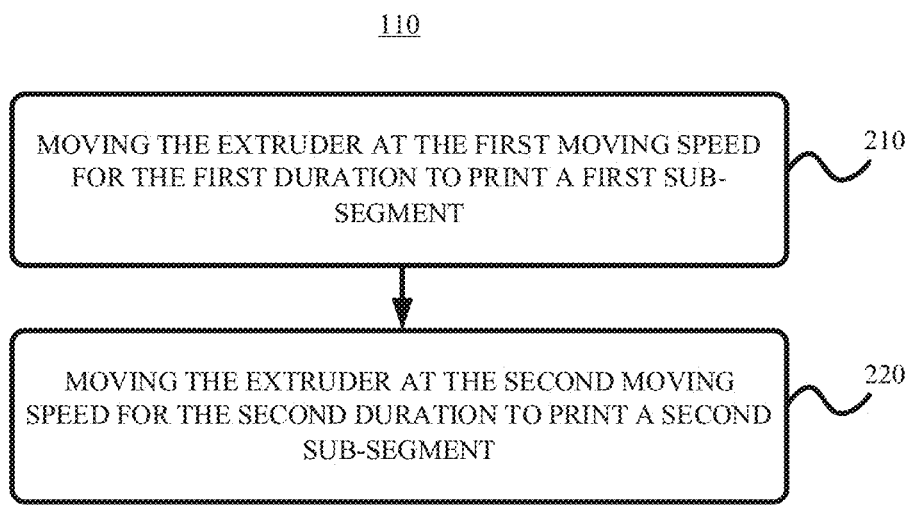
FIG. 2 shows a flowchart of an example process of printing a test pattern in the method of FIG. 1 according to an embodiment of the present disclosure.

FIG. 2 shows a flowchart of an example process of printing a test pattern (step 110) in the method 100 of FIG. 1 according to an embodiment of the present disclosure. According to some embodiments, the at least one segment may include a plurality of straight-line segments parallel to each other, and the causing the extruder to print the test pattern (step 110) may include steps 210 and 220.

In step 210, the extruder is caused to move at a first movement speed for a first duration to print a first sub-segment.

In step 220, the extruder is caused to move at a second movement speed for a second duration to print a second sub-segment.

In some embodiments, the test pattern may comprise a plurality of straight-line segments, each straight-line segment being printed with two speeds. For example, a first section (the first sub-segment) of a straight-line segment is printed by the extruder moving at the first movement speed, and a second section (the second sub-segment) of the straight-line segment is printed by the extruder moving at the second movement speed.

In the above embodiment, by printing each of the plurality of straight lines parallel to each other at two different speeds, the cross-sectional areas of the straight lines measured by the detection device can more accurately reflect the change in the extrusion speed of the extruder, so as to ensure that the compensation coefficient obtained by subsequent analysis can better compensate the change in the extrusion speed, thereby improving the quality of 3D printing.

Figure 3:
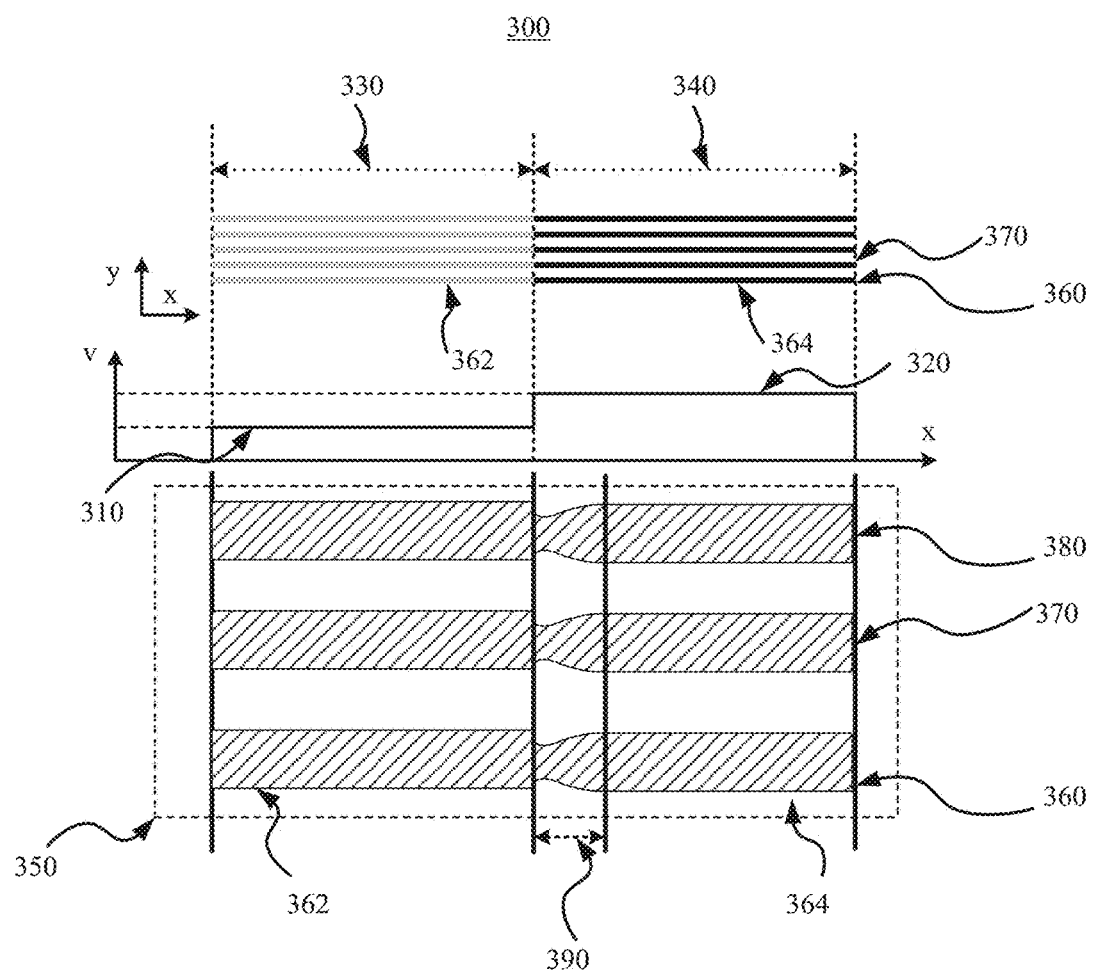
FIG. 3 shows a schematic diagram of an example process of printing a test pattern according to an embodiment of the present disclosure.

FIG. 3 shows a schematic diagram of an example process of printing a test pattern according to an embodiment of the present disclosure. As shown in FIG. 3, the preset printing scheme 300 causes the extruder to move in the x-axis direction at two speeds (a first speed 310 and a second speed 320) to print a test pattern 350. Specifically, the extruder moves at the first speed 310 for a first duration 330 to print a first sub-segment 362 of a straight-line segment 360, and moves at the second speed 330 for a second duration 340 to print a second sub-segment 364 of the straight-line segment 360. In addition, the test pattern 350 includes a plurality of straight-line segments parallel to each other, such as straight-line segments 360, 370, 380, and so on. In some embodiments, the first duration 330 and the second duration 340 may be equal.

In some embodiments, the first speed 310 may be set to be less than the second speed 320. In this case, it can be seen from the test pattern 350 that when the movement speed of the extruder transitions from the slow one 310 to the fast one 320, the printed straight-line segments such as 360 and 370 suddenly become thinner at the speed step and then gradually become thicker. Stage 390 in FIG. 3 represents the change process of the printed straight line from thin to thick when the movement speed of the extruder changes.

Figure 4:
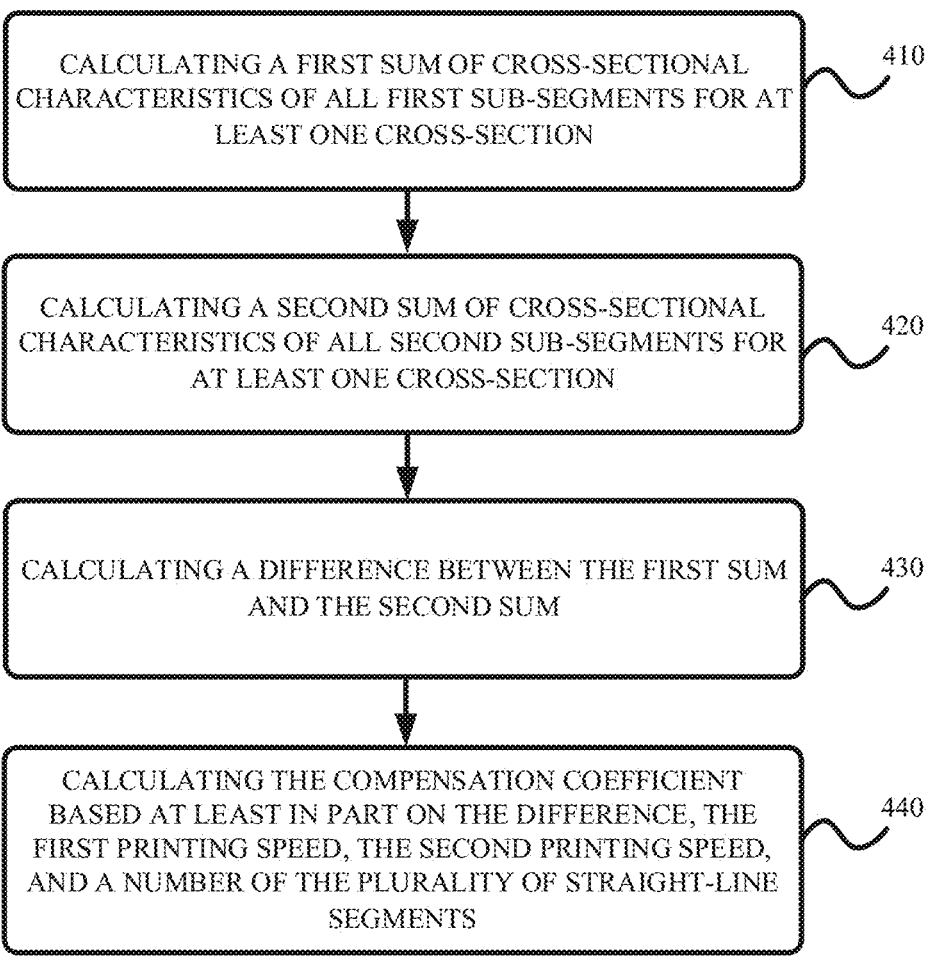
FIG. 4 shows a flowchart of an example process of determining a compensation coefficient in the method of FIG. 1 according to an embodiment of the present disclosure.

FIG. 4 shows a flowchart of an example process of determining a compensation coefficient (step 130) in the method 100 of FIG. 1 according to an embodiment of the present disclosure. As shown in FIG. 4, step 130 may include steps 410 to 440.

In step 410, a first sum is calculated of cross-sectional characteristics of all first sub-segments for at least one cross-section.

In step 420, a second sum is calculated of cross-sectional characteristics of all second sub-segments for at least one cross-section.

In step 430, a difference is calculated between the first sum and the second sum.

In step 440, the compensation coefficient is calculated based at least in part on the difference, the first movement speed, the second movement speed, and a number of the plurality of straight-line segments.

The process of determining the compensation coefficient according to the method shown in FIG. 4 in some embodiments will be described below in conjunction with FIG. 5.

Figure 5:
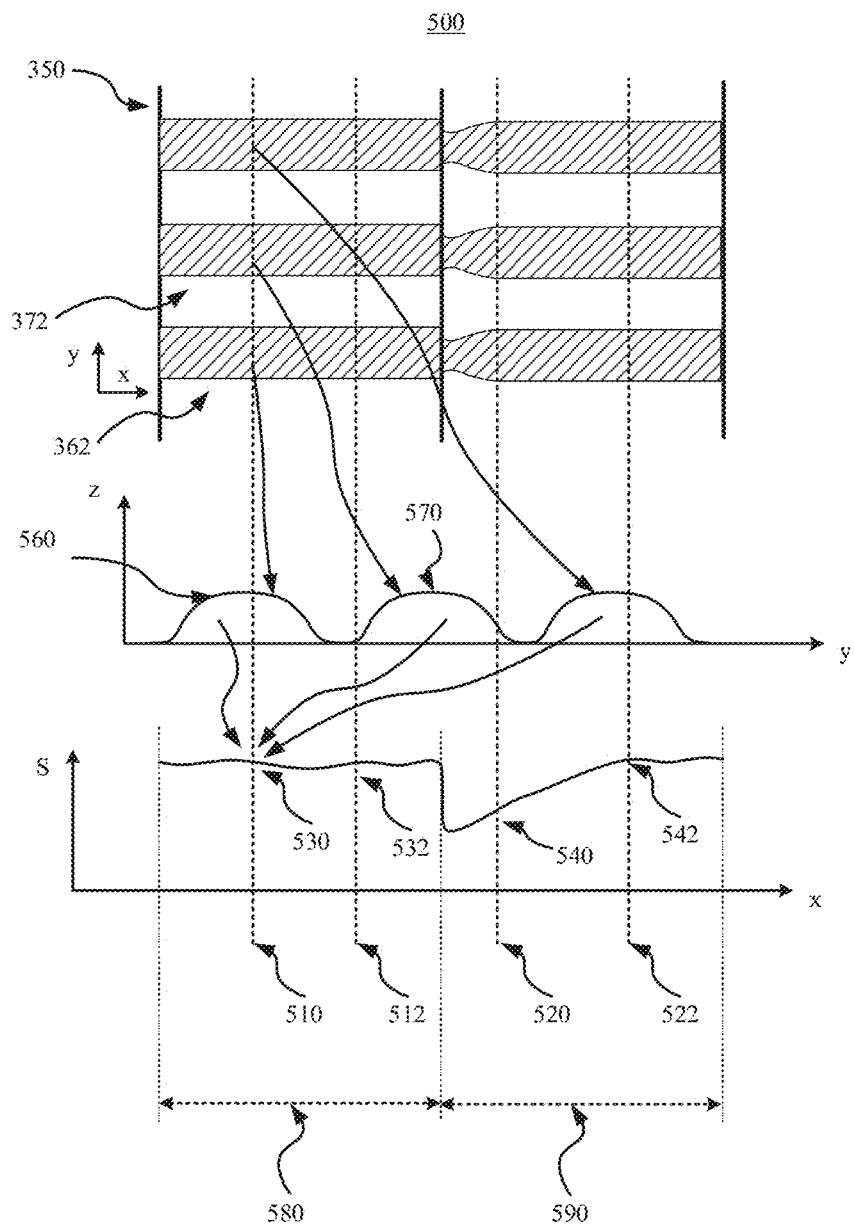
FIG. 5 shows a schematic diagram of an example process of determining a compensation coefficient according to an embodiment of the present disclosure.

FIG. 5 shows a schematic diagram of an example process 500 for determining a compensation coefficient according to an embodiment of the present disclosure, in which reference numerals similar to those shown in FIG. 3 denote similar elements, and details are not described herein again. After the preset printing scheme 300 causes the extruder to print the test pattern 350 along the x-axis direction, the detection device such as a contour scanner can be used to scan the test pattern 350 along the x-axis direction. As shown in FIG. 5, taking any scanning point 510 (also referred to as a "cross section") in the x-axis as an example, the detection device detects all first sub-segments (e.g., the first sub-segments 362, 372, etc.) of the test pattern 350 at the scanning point 510 to obtain contour lines of all the first sub-segments in the y-axis direction. In this example, the contour line of the first sub-segment 362 in the y-axis direction at the scanning point 510 is contour line 560, and the contour line of the second sub-segment 372 in the y-axis direction at the scanning point 510 is contour line 570. Based on the obtained contour lines, the cross-sectional characteristic (e.g., cross-sectional area or projection width) of each first sub-segment at the scanning point 510 can be further determined. Next, the cross-sectional characteristics of all the first sub-segments determined at the scanning point 510 are summed, so as to obtain a sum 530 of the cross-sectional characteristics at the scanning point 510.

Further, the detection device will perform the same scan at multiple scanning points ("cross-sections"), such as scanning points 510, 512, etc., along the x-axis direction, so as to obtain the sums 530, 532, etc. of cross-sectional characteristics corresponding to respective scanning points. Next, a first sum 580 of the cross-sectional characteristics at the scanning points of all the first sub-segments 362, 372, etc. is calculated. The first sum 580 can be obtained by adding up the sums 530, 532, etc. of cross-sectional characteristics at all scanning points of all the first sub-segments. For the second sub-segment, the detection device will perform the same scanning process as the first sub-segment, for example, scanning at respective scanning points 520, 522, etc. to determine respective sums 540, 542, etc. of cross-sectional characteristics of all the second sub-segments corresponding to the respective scanning points. In some embodiments, a second sum 590 may be obtained by adding up the sums 540, 542, etc. of cross-sectional characteristic at all scanning points of all the second sub-segments.

Next, the difference value between the first sum 580 and the second sum 590 can be calculated.

Finally, the compensation coefficient can be calculated based at least in part on the difference value, the first movement speed 310, the second movement speed 320, and the number of straight-line segments. In some embodiments, the compensation coefficient can be calculated as:

$$k_{comp} = \frac{Vol_\Delta}{k_e(v_{p1} - v_{p2})nS_{fill}}$$

Where $k_{comp}$ represents the compensation coefficient, $Vol_\Delta$ represents, for example, the difference value between the first sum 580 and the second sum 590, n represents the number of straight-line segments printed (3 straight-line segments 360, 370 and 380 are shown in FIG. 3, for example), and $v_{p1}$ and $v_{p2}$ represent two of the at least two movement speeds respectively, where the value of $v_{p1}$ is greater than the value of $v_{p2}$. For example, $v_{p1}$ can be the second speed 320 in FIG. 3, and $v_{p2}$ can be the first speed 310 in FIG. 3. $k_e$ represents the amount of the printing material filament that needs to be fed into the extruder when the extruder moves a unit distance (e.g., 1 mm), and $S_{fill}$ represents the cross-sectional area of the printing material filament fed into the extruder.

In summary, the embodiments of the present disclosure print a test pattern according to a preset scheme and automatically detect the difference in the volumes of the extruded lines of the printed pattern obtained at different speeds. This volume difference reflects the volume of the printing material filament fed into the extruder required to maintain the pressure in the extruder and make the extrusion speed reach the desired value. As a result, an accurate compensation coefficient can be obtained and the quality of 3D printing improved.

In other example embodiments, the preset printing scheme may include a plurality of printing time periods, each printing time period including a plurality of consecutive printing cycles. Each of the printing cycles is divided into a first duration and a second duration. The preset printing scheme specifies that during each printing cycle, the extruder moves at a third movement speed of at least two movement speeds for the first duration, and moves at a fourth movement speed of the at least two movement speeds for the second duration. In some embodiments, each printing cycle may be equally divided into the first duration and the second duration.

Figure 6:
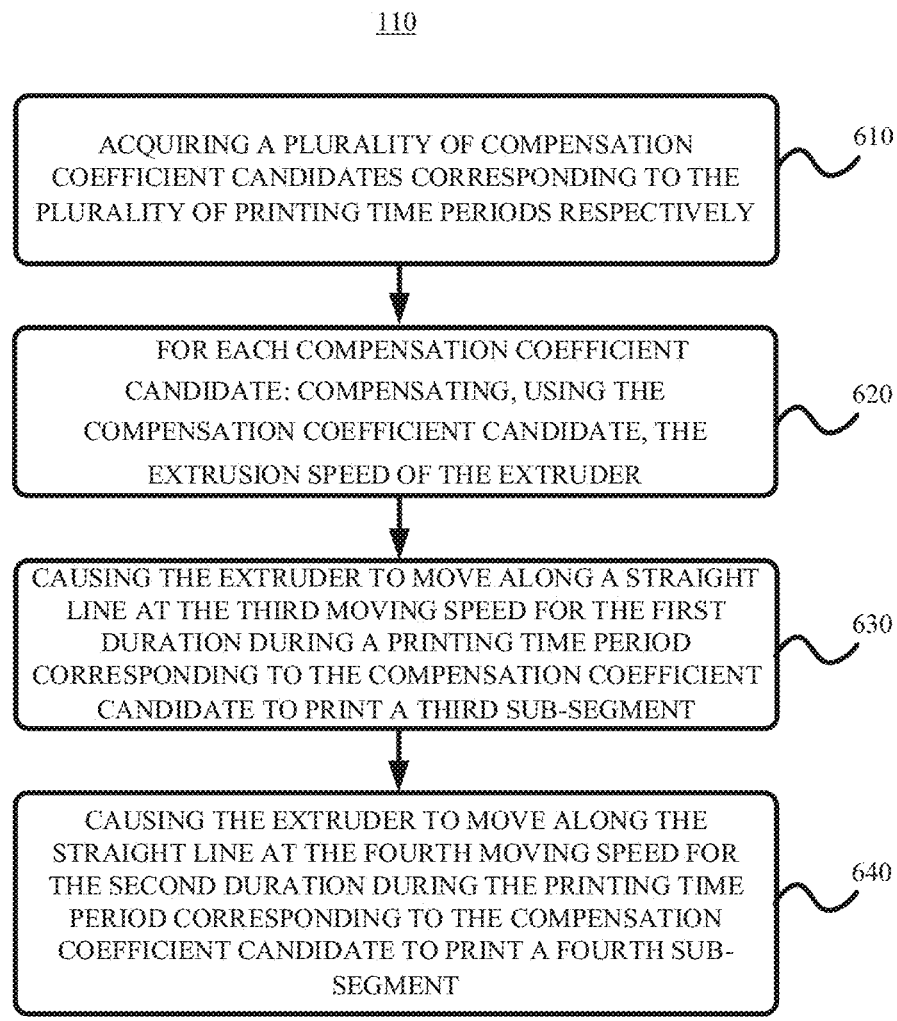
FIG. 6 shows a flowchart of an example process of printing a test pattern in the method of FIG. 1 according to another embodiment of the present disclosure.

FIG. 6 shows a flowchart of an example process of printing a test pattern (step 110) in the method of FIG. 1 according to an embodiment of the present disclosure. As shown in FIG. 6, step 110 may include steps 610 to 640.

In step 610, a plurality of compensation coefficient candidates is acquired corresponding to the plurality of printing time periods respectively.

In step 620, for each compensation coefficient candidate, the extrusion speed of the extruder is compensated using the compensation coefficient candidate.

In step 630, the extruder is caused to move along a straight line at the third movement speed for the first duration during a printing time period corresponding to the compensation coefficient candidate to print a third sub-segment.

In step 640, the extruder is caused to move along the straight line at the fourth movement speed for the second duration during the printing time period corresponding to the compensation coefficient candidate to print a fourth sub-segment.

In some embodiments, the plurality of compensation coefficient candidates may be preset, and then the extruder prints a corresponding pattern under each compensation coefficient candidate. In some embodiments, under each compensation coefficient candidate, the printing may be repeated multiple times with a certain period, and in each period the printing may be performed alternately at two different speeds.

Figure 7:
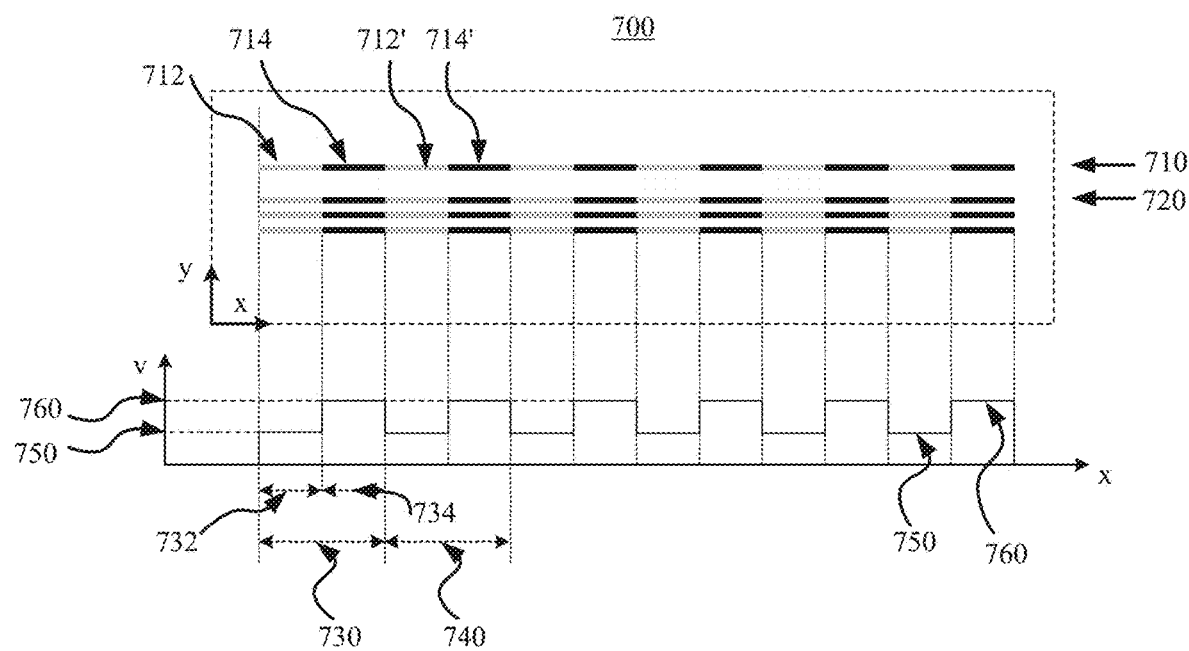
FIG. 7 shows a schematic diagram of an example process of a preset printing scheme according to another embodiment of the present disclosure.

FIG. 7 shows a schematic diagram of an example process of a preset printing scheme 700 according to an embodiment of the present disclosure. As shown in FIG. 7, the preset printing scheme 700 includes multiple printing time periods, and each printing time period includes multiple consecutive printing cycles, such as printing cycles 730 and 740. Each printing cycle is equally divided into a first duration and a second duration. For example, the printing cycle 730 is equally divided into a first duration 732 and a second duration 734. In some embodiments, the preset printing scheme 700 includes a plurality of compensation coefficient candidates (e.g., compensation coefficient candidates 710 and 720) corresponding to a plurality of printing time periods respectively.

Taking the compensation coefficient candidate 710 as an example, the compensation coefficient candidate 710 is used to compensate the extrusion speed of the extruder. The extruder moves linearly along the x-axis at the third movement speed 750 for the first duration 732 of each cycle (e.g., the cycle 730) to print the third sub-segment 712, and moves linearly along the x-axis at the fourth movement speed 760 for the second duration 734 to print the fourth sub-segment 714. Similarly, if there are other printing cycles, for example in the printing cycle 740, the extruder will perform the same movement as described in the printing cycle 730 to print the third sub-segment 712' and the fourth sub-segment 714'.

Further, for each of the other compensation coefficient candidates, a printing operation similar to that described in connection with the compensation coefficient candidate 710 is performed.

Figure 8:
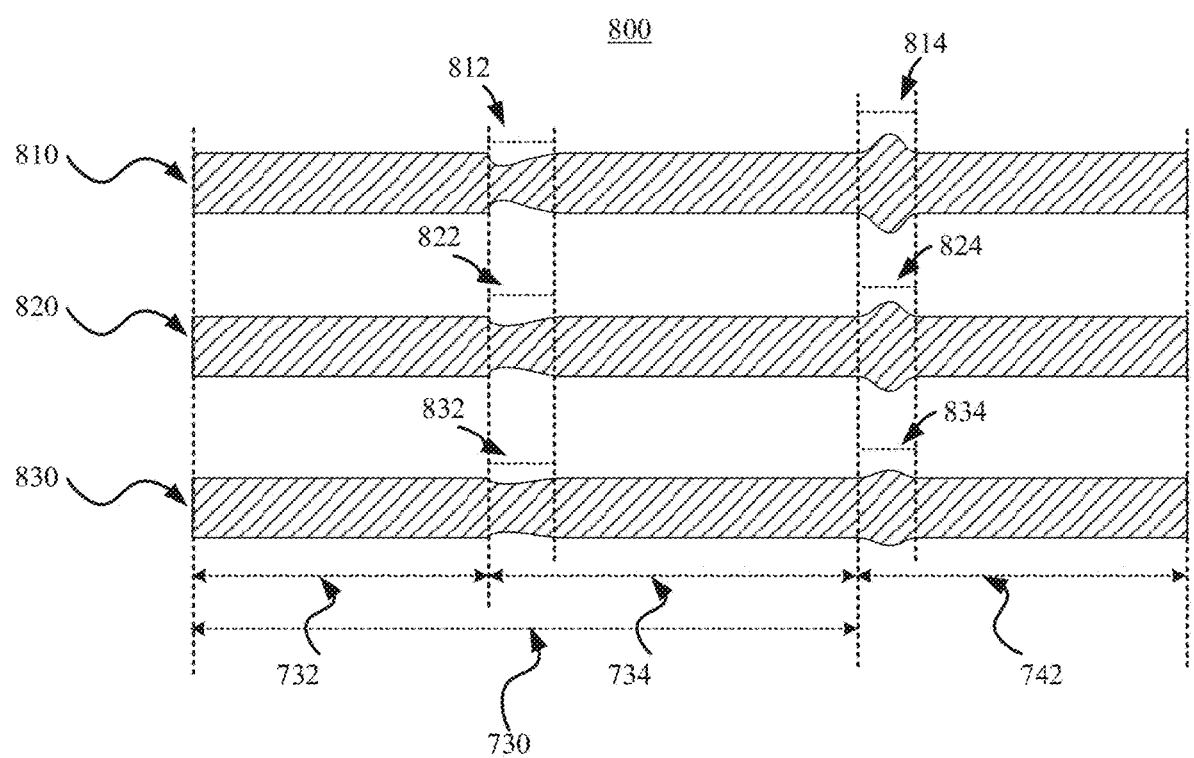
FIG. 8 shows a schematic diagram of an example process of printing a test pattern according to the preset printing scheme of FIG. 7 according to an embodiment of the present disclosure.

FIG. 8 shows a schematic diagram of an example process 800 of printing a test pattern according to the preset printing scheme 700 of FIG. 7 according to an embodiment of the present disclosure, in which reference numerals similar to those in FIG. 7 indicate similar elements, and will not be repeated here. As shown in FIG. 8, the extrusion speed of the extruder is compensated based on different compensation coefficient candidates 810, 820, and 830 to print the test pattern in corresponding printing time periods. Taking the compensation coefficient candidate 810 as an example, the extruder prints the third sub-segment at the third movement speed 750 during the first duration 732 and the first duration 742, and prints the fourth sub-segment at the fourth movement speed 760 during the second duration 734. Since the movement speed of the extruder changes alternately in the cycle 730, uneven thicknesses 812 and 814 appear at the junction of the third sub-segment and the fourth sub-segment, where the movement speed transitions. For example, when the third movement speed 750 is less than the fourth movement speed 760, the extruder moves to the second duration 734, and the speed transitions from the third movement speed 750 to the fourth speed 760. Due to the hysteresis of the change in the extrusion speed, uneven printing (depression) occurs in section 812. Similarly, when the extruder moves to the first duration 742, the speed transitions from the fourth movement speed 760 to the third movement speed 750, resulting in uneven printing (bulging) in section 814.

As shown in FIG. 8, using different compensation coefficient candidates 810, 820, and 830 to compensate the extrusion speed of the extruder to print a test pattern will cause the uneven printing sections to change accordingly. In this example, uneven sections 822 and 824 corresponding to the compensation coefficient candidate 820 are flatter than the uneven sections 812 and 814 corresponding to the compensation coefficient candidate 810, and uneven sections 832 and 834 corresponding to the compensation coefficient candidate 830 are even flatter.

In summary, some embodiments of the present disclosure can select a preset printing scheme for periodic printing in which the extruder prints alternately at different speeds in each cycle, and the printed test pattern reflects the change of the extrusion speed under different compensation coefficients (for example, the change of each uneven section under different compensation coefficients in FIG. 8). With this preset printing scheme, the influence of measurement errors can be reduced and the detection accuracy improved, thereby obtaining a better compensation coefficient.

In some embodiments, the detecting the cross-sectional characteristic of the test pattern on the predetermined path includes: scanning, using the detection device, a first number of scanning points along the straight line for all third sub-segments and all fourth sub-segments printed in each printing time period; and determining, based on scanning results at the first number of scanning points, respective cross-sectional characteristics corresponding to the first number of scanning points.

Figure 9:
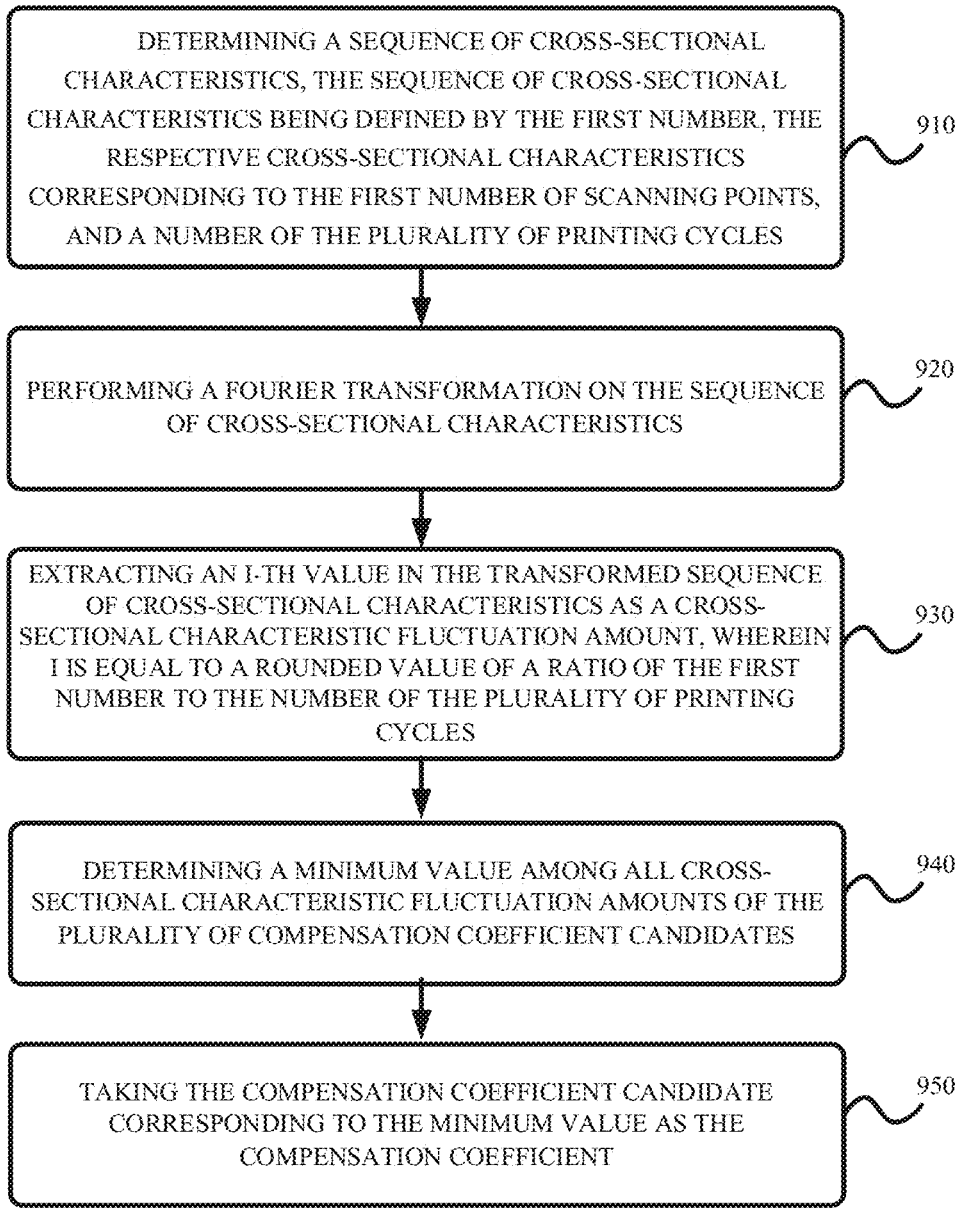
FIG. 9 shows a flowchart of an example process of determining a compensation coefficient according to an embodiment of the present disclosure.

FIG. 9 shows a flowchart of an example process of determining a compensation coefficient (step 130) according to an embodiment of the present disclosure. As shown in FIG. 9, step 130 may include steps 910 to 950.

In step 910, for each of the compensation coefficient candidates, a sequence of cross-sectional characteristics is determined, the sequence of cross-sectional characteristics being defined by the first number, the respective cross-sectional characteristics corresponding to the first number of scanning points, and a number of the plurality of printing cycles.

In step 920, a Fourier transformation is performed on the sequence of cross-sectional characteristics.

In step 930, an i-th value in the transformed sequence of cross-sectional characteristics is extracted as a cross-sectional characteristic fluctuation amount, wherein i is equal to a rounded value of a ratio of the first number to the number of the plurality of printing cycles.

In step 940, a minimum value is determined among all cross-sectional characteristic fluctuation amounts of the plurality of compensation coefficient candidates.

In step 950, the compensation coefficient candidate corresponding to the minimum value is taken as the compensation coefficient.

The process of determining the compensation coefficient according to the method shown in FIG. 9 in some embodiments will be illustrated below in conjunction with FIG. 10.

Figure 10:
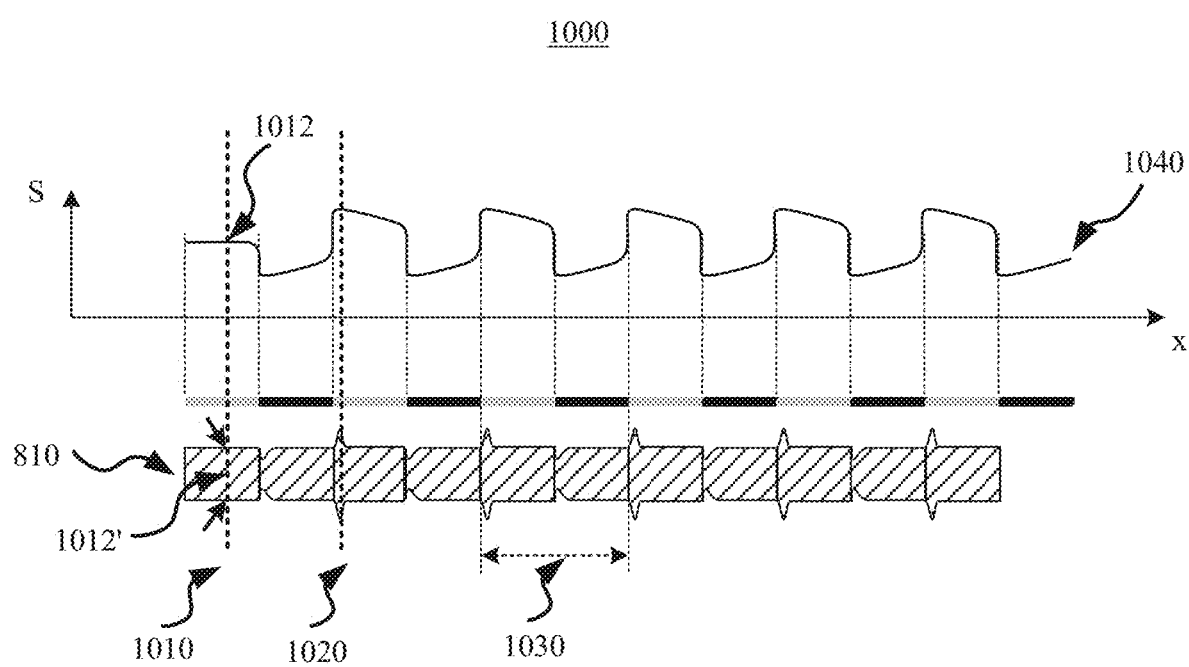
FIG. 10 shows a schematic diagram of an example process of determining a compensation coefficient according to an embodiment of the present disclosure.

FIG. 10 shows a schematic diagram of an example process 1000 of determining a compensation coefficient according to an embodiment of the present disclosure.

As shown in FIG. 10, after the extruder prints the test pattern under the compensation coefficient candidate 810, the detection device scans along the x-axis. For example, at any scanning point 1010, the detection device such as a contour scanner is used to obtain the cross-sectional characteristic corresponding to the test pattern at the scanning point 1010. The test pattern can be scanned along the x-axis at 1010, 1020, and other scanning points for the first number of points to determine a sequence 1040 of cross-sectional characteristics for the compensation coefficient candidate 810. In some embodiments, the first number of points can be denoted as g points, and $S_j(x)$ represents the cross-sectional characteristics obtained by scanning along the x-axis using the detection device under the j-th compensation coefficient candidate. Next, a Fourier transformation (e.g., fast Fourier transformation) can be performed on $S_j(x)$ to obtain a transformed result $FS_j(x)$. For the sequence $FS_j(x)$, the i-th value therein can be extracted as a fluctuation amount $A_j$ of the cross-sectional characteristics of the test pattern printed caused by the alternating-speed printing under the j-th compensation coefficient candidate, where i can satisfy i=g/n, where n represents the number of printing cycles 1030 under the j-th compensation coefficient candidate.

Next, all fluctuation amounts of the cross-sectional characteristics under all the compensation coefficient candidates may be extracted, and the smallest fluctuation amount of the cross-sectional characteristics among them may be determined and denoted as $A_j[m]$, which represents that the fluctuation amount of the cross-sectional characteristics of the m-th pattern is the smallest. Finally, the compensation coefficient $k_{comp}$ can be determined as the compensation coefficient candidate $k_m$ corresponding to the m-th pattern, that is, $k_{comp}=k_m$.

In some embodiments, the detection device may include a contour scanner or a computer vision system. In some embodiments, the computer vision system can be used to capture the test pattern directly, and the projection width at each scanning point along the x-axis can be calculated to approximate the cross-sectional area at the scanning point. In some embodiments, at the scanning point 1010, instead of directly detecting the cross-sectional area 1012 as the cross-sectional characteristic, the projection width 1012' of the projection of the test pattern onto the printing plane at the scanning point 1010 may be detected, and the projected width 1012' is approximated as the cross-sectional area 1012. Then, the printing pattern with the smallest fluctuation amount is determined, and the compensation coefficient candidate corresponding to such a printing pattern is obtained as the most suitable compensation coefficient.

In summary, some embodiments of the present disclosure can cause the extruder to print a test pattern under different compensation coefficient candidates, and to print alternately at a different speed in each cycle. The printed test pattern reflects the fluctuations in cross-sectional characteristics due to the change in the movement speed. Then the detection device is used to perform automatic detection and the print pattern with the smallest fluctuation amount is determined. Finally, the compensation coefficient candidate corresponding to the print pattern with the smallest fluctuation amount is used as the final compensation coefficient. During the entire compensation coefficient determination process, there is no need to manually judge the printing effect under different compensation coefficient candidates, which saves the user's time and labor costs, thereby lowering the threshold for obtaining a good compensation coefficient.

Figure 11:
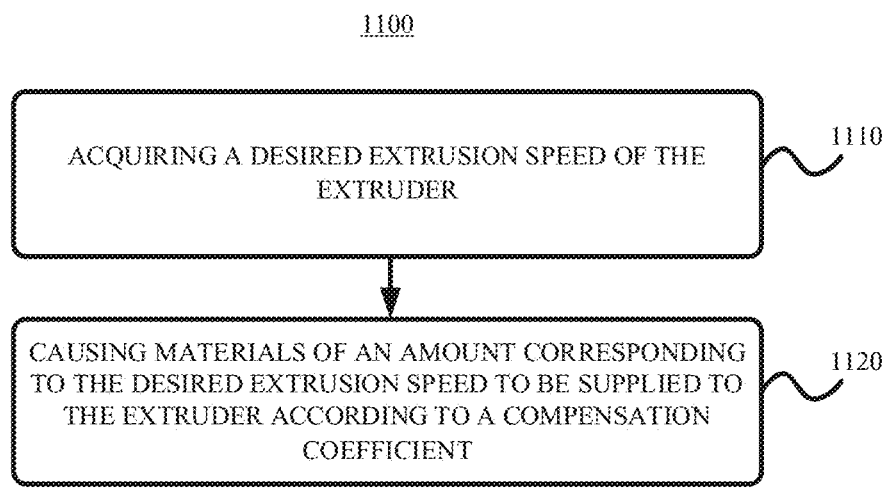
FIG. 11 shows a control method of a 3D printer according to an embodiment of the present disclosure.

FIG. 11 shows a control method 1100 of a 3D printer according to an embodiment of the present disclosure, where the 3D printer includes an extruder. As shown in FIG. 11, the method 1100 includes steps 1110 and 1120. In step 1110, a desired extrusion speed of the extruder is acquired. In step 1120, materials of an amount corresponding to the desired extrusion speed is caused to be supplied to the extruder according to a compensation coefficient, wherein the compensation coefficient is obtained by the method as described in the above embodiments.

In summary, because the method 1100 uses the compensation coefficient obtained by the embodiment of the present disclosure to compensate the feed rate of the extruder, the problem of the hysteresis of the extrusion speed is alleviated, and the printing effect of the 3D printer is improved.

Figure 12:
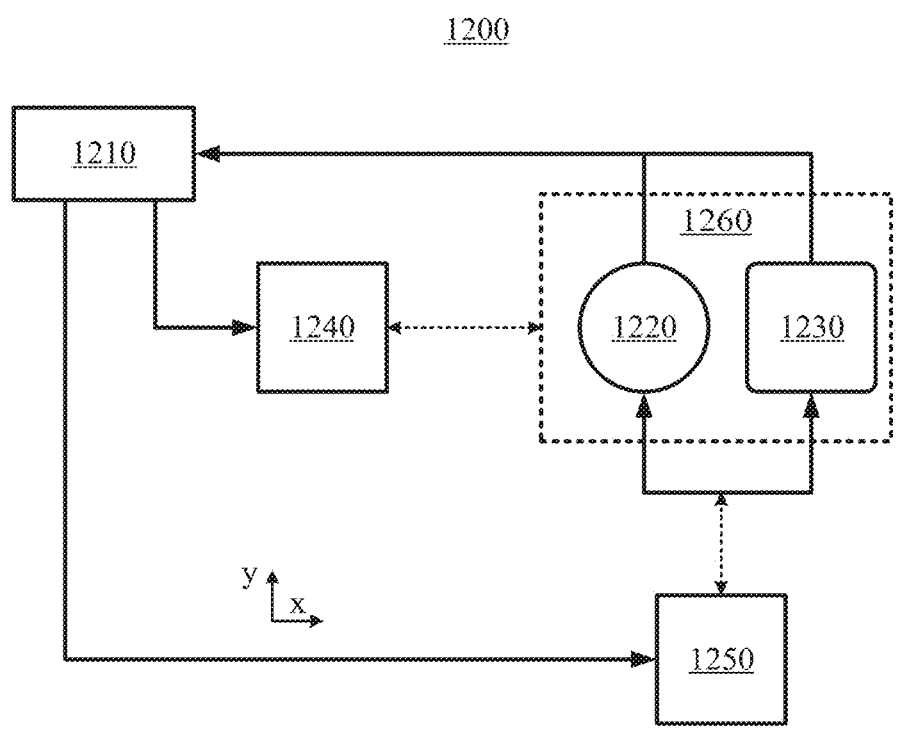
FIG. 12 shows a schematic diagram of a 3D printer according to an embodiment of the present disclosure.

FIG. 12 shows a schematic diagram of a 3D printer 1200 according to an embodiment of the present disclosure. As shown in FIG. 12, the 3D printer 1200 includes an extruder 1220, a detection device 1230, and a processor 1210. In some embodiments, the processor 1210 may be configured to execute instructions to implement the compensation method of the 3D printer as described in the embodiments of the present disclosure. Examples of the processor 1210 include, but are not limited to, a motion controller.

In some embodiments, the processor 1210 may control the extruder 1220 and the detection device 1230 to move in the x-axis direction through motor 1240, and control the extruder 1220 and the detection device 1230 to move in the y-axis direction through motor 1250.

In some embodiments, the extruder 1220 and the detection device 1230 may both be installed on tool head 1260, and the tool head 1260 may be controlled by the processor 1210 to move along the x-axis and/or y-axis direction.

In some embodiments, when implementing the compensation method of the 3D printer described herein, the processor 1210 can control the extruder 1220 to print the test pattern. Further, after the test pattern printing is completed, the processor 1210 controls the detection device 1230 to move to the starting point of the test pattern, and then uses the detection device 1230 to scan the test pattern to the end point. After the scan is completed, the processor 1210 can analyze the data detected by the detection device 1230 and determine the compensation coefficient.

In summary, the 3D printer 1200 can automatically control the extruder 1220 and the detection device 1230 to perform test pattern printing and detection through a preset scheme, and analyze the results through the processor 1210 to determine the optimal compensation coefficient. As there is no need to expend manpower to detect and judge the test pattern during this period, the technical threshold for improving the printing quality of the 3D printer 1200 is lowered.

Figure 13:
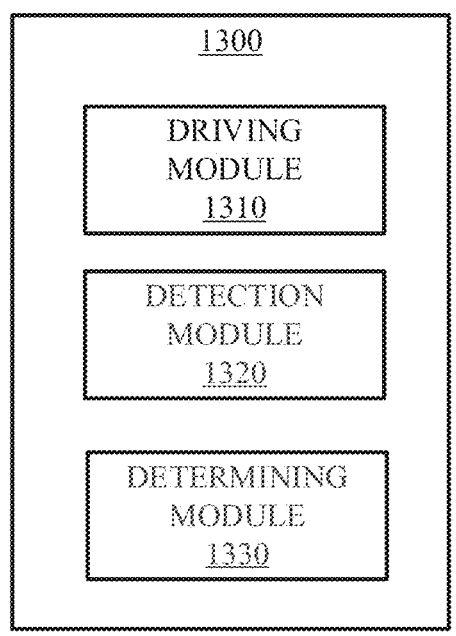
FIG. 13 shows a structural block diagram of a compensation device of a 3D printer according to an embodiment of the present disclosure.

FIG. 13 shows a structural block diagram of a compensation apparatus 1300 of a 3D printer according to an embodiment of the present disclosure. The 3D printer includes an extruder and a detection device. As shown in FIG. 13, the compensation apparatus 1300 includes a driving module 1310, a detection module 1320 and a determination module 1330.

The driving module 1310 may be configured to cause the extruder to print a test pattern based on a preset printing scheme, wherein the preset printing scheme specifies that the extruder moves at at least two movement speeds during extrusion of materials to print the test pattern.

The detection module 1320 may be configured to detect, using the detection device, an extrusion speed characteristic of the extruder from the test pattern.

The determination module 1330 may be configured to determine, based on the detected extrusion speed characteristic, a compensation coefficient for compensating an extrusion speed of the extruder.

Figure 14:
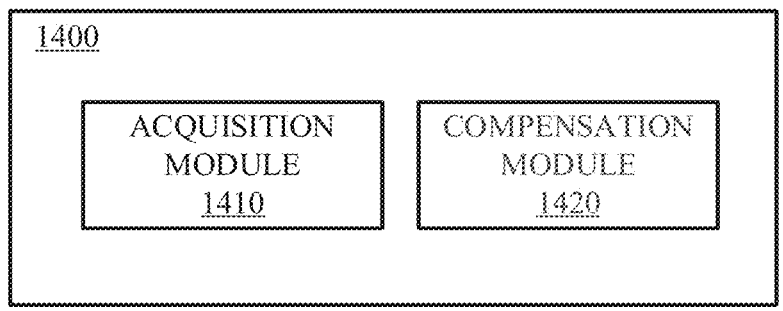
FIG. 14 shows a structural block diagram of a control device of a 3D printer according to an embodiment of the present disclosure.

FIG. 14 shows a structural block diagram of a control apparatus 1400 of a 3D printer according to an embodiment of the present disclosure. The 3D printer includes an extruder. As shown in FIG. 14, the control apparatus 1400 includes an acquisition module 1410 and a compensation module 1420.

The acquisition module 1410 may be configured to acquire a desired extrusion speed of the extruder.

The compensation module 1420 may be configured to cause materials of an amount corresponding to the desired extrusion speed to be supplied to the extruder according to a compensation coefficient, wherein the compensation coefficient is obtained by using the compensation method of the 3D printer as described in any embodiment of the present disclosure.

Although specific functions have been discussed above with reference to specific modules, it should be noted that the functions of each module discussed herein may be divided into multiple modules, and/or at least some functions of multiple modules may be combined into a single module. The specific module execution action discussed herein includes the specific module itself performing the action, or alternatively the specific module calls or otherwise accesses another component or module that performs the action (or performs the action in conjunction with the specific module). Therefore, a specific module that performs an action may include the specific module itself that performs an action and/or another module that is called or accessed by the specific module to perform an action.

It should also be understood that various techniques may be described herein in the general context of software hardware elements or program modules. The various modules described above with respect to FIGS. 13 and 14 may be implemented in hardware or in hardware combined with software and/or firmware. For example, these modules may be implemented as computer program codes/instructions configured to be executed in one or more processors and stored in a computer-readable storage medium. Alternatively, these modules can be implemented as hardware logic/circuitry. For example, in some embodiments, one or more of these modules may be implemented together in a system on chip (SoC). The SoC may include an integrated circuit chip (which includes a processor (for example, a central processing unit (CPU), a microcontroller, a microprocessor, a digital signal processor (DSP), etc.), a memory, one or more communication interfaces, and/or one or more components in other circuits), and can optionally perform the connected received program code and/or includes embedded firmware to perform functions.

According to an embodiment of the present disclosure, a non-transitory computer-readable storage medium having instructions stored thereon is provided. The instructions are to cause, for example, the 3D printer 1200 to execute the method described in any of the embodiments of the present disclosure.

According to an embodiment of the present disclosure, a computer program product is provided, including instructions to cause, for example, the 3D printer 1200 to execute the method described in any embodiment of the present disclosure.

It should be understood that the various forms of processes shown above can be used to reorder, add or delete steps. For example, the steps described in the present disclosure may be executed in parallel, sequentially or in a different order, as long as the desired result of the technical solution disclosed in the present disclosure can be achieved, this is not limited herein.

Although the embodiments or examples of the present disclosure have been described with reference to the accompanying drawings, it should be understood that the above-mentioned methods, systems, and devices are merely exemplary embodiments or examples, and the scope of the present disclosure is not limited by these embodiments or examples, but is only limited by the granted claims and the equivalents thereof. Various elements in the embodiments or examples may be omitted or may be replaced by equivalent elements. In addition, the steps may be performed in an order different from that described in the present disclosure. Further, various elements in the embodiments or examples can be combined in various ways. What is important is that as technology evolves, many elements described herein can be replaced by equivalent elements appearing after this disclosure.

What is claimed is:

1. A compensation method for a 3D printer, wherein the 3D printer comprises an extruder and a detection device, the method comprising:
    causing the extruder to print a test pattern based on a preset printing scheme, wherein the preset printing scheme specifies that the extruder moves at at least two movement speeds during extrusion of materials to print the test pattern;
    detecting, using the detection device, an extrusion speed characteristic of the extruder from the test pattern; and
    determining, based on the detected extrusion speed characteristic, a compensation coefficient for compensating an extrusion speed of the extruder,
    wherein the test pattern extends along a predetermined path, and
    wherein the detecting the extrusion speed characteristic of the extruder from the test pattern comprises detecting a cross-sectional characteristic representing a cross-sectional area of the test pattern on the predetermined path as the extrusion speed characteristic.

2. The method of claim 1,
    wherein the test pattern comprises at least one segment, and
    wherein the preset printing scheme specifies that during printing of each segment, the extruder moves at a first movement speed of the at least two movement speeds for a first duration and moves at a second movement speed of the at least two movement speeds for a second duration immediately after the first duration.

3. The method of claim 2,
    wherein the at least one segment comprises a plurality of straight-line segments parallel to each other, and
    wherein the causing the extruder to print the test pattern comprises:
    during the printing of each straight-line segment:
    moving the extruder at the first movement speed for the first duration to print a first sub-segment; and
    moving the extruder at the second movement speed for the second duration to print a second sub-segment.

4. The method of claim 3, wherein the determining the compensation coefficient for compensating the extrusion speed of the extruder comprises:
    calculating a first sum of cross-sectional characteristics of all first sub-segments for at least one cross-section;
    calculating a second sum of cross-sectional characteristics of all second sub-segments for at least one cross-section;
    calculating a difference between the first sum and the second sum; and
    calculating the compensation coefficient based at least in part on the difference, the first movement speed, the second movement speed, and a number of the plurality of straight-line segments.

5. The method of claim 1,
wherein the preset printing scheme comprises a plurality of printing time periods, each printing time period comprising a plurality of consecutive printing cycles, each printing cycle being divided into a first duration and a second duration, and
wherein the preset printing scheme specifies that during each printing cycle, the extruder moves at a third movement speed of the at least two movement speeds for the first duration and moves at a fourth movement speed of the at least two movement speeds for the second duration.

6. The method of claim 5, wherein the causing the extruder to print the test pattern comprises:
acquiring a plurality of compensation coefficient candidates corresponding to the plurality of printing time periods respectively;
for each compensation coefficient candidate:
compensating, using the compensation coefficient candidate, the extrusion speed of the extruder;
causing the extruder to move along a straight line at the third movement speed for the first duration during a printing time period corresponding to the compensation coefficient candidate to print a third sub-segment; and
causing the extruder to move along the straight line at the fourth movement speed for the second duration during the printing time period corresponding to the compensation coefficient candidate to print a fourth sub-segment.

7. The method of claim 6, wherein the detecting the cross-sectional characteristic of the test pattern on the predetermined path comprises:
scanning, using the detection device, a first number of scanning points along the straight line for all third sub-segments and all fourth sub-segments printed in each printing time period; and
determining, based on scanning results at the first number of scanning points, respective cross-sectional characteristics corresponding to the first number of scanning points.

8. The method of claim 7, wherein the determining the compensation coefficient for compensating the extrusion speed of the extruder comprises:
for each of the compensation coefficient candidates:
determining a sequence of cross-sectional characteristics, the sequence of cross-sectional characteristics being defined by the first number, the respective cross-sectional characteristics corresponding to the first number of scanning points, and a number of the plurality of printing cycles;
performing a Fourier transformation on the sequence of cross-sectional characteristics; and
extracting an i-th value in the transformed sequence of cross-sectional characteristics as a cross-sectional characteristic fluctuation amount, wherein i is equal to a rounded value of a ratio of the first number to the number of the plurality of printing cycles;
determining a minimum value among all cross-sectional characteristic fluctuation amounts of the plurality of compensation coefficient candidates; and
taking the compensation coefficient candidate corresponding to the minimum value as the compensation coefficient.

9. The method of claim 1, wherein the cross-sectional characteristic comprises: a cross-sectional area of the test pattern on the predetermined path or a width of a projection of the test pattern onto a printing plane on the predetermined path.

10. The method of claim 1, wherein the detection device comprises one selected from a group consisting of a computer vision system and a contour scanner.

11. A method for controlling a 3D printer, wherein the 3D printer comprises an extruder, the method comprising:
acquiring a desired extrusion speed of the extruder; and
causing materials of an amount corresponding to the desired extrusion speed to be supplied to the extruder according to a compensation coefficient, wherein the compensation coefficient is obtained by the method according to claim 1.

12. A 3D printer, comprising:
an extruder;
a detection device; and
a processor configured to execute instructions to perform operations comprising:
causing the extruder to print a test pattern based on a preset printing scheme, wherein the preset printing scheme specifies that the extruder moves at at least two movement speeds during extrusion of materials to print the test pattern;
detecting, using the detection device, an extrusion speed characteristic of the extruder from the test pattern; and
determining, based on the detected extrusion speed characteristic, a compensation coefficient for compensating an extrusion speed of the extruder,
wherein the test pattern extends along a predetermined path, and
wherein the detecting the extrusion speed characteristic of the extruder from the test pattern comprises detecting a cross-sectional characteristic representing a cross-sectional area of the test pattern on the predetermined path as the extrusion speed characteristic.

13. A non-transitory computer-readable storage medium having instructions stored thereon, wherein the instructions are to cause a 3D printer comprising an extruder and a detection device to perform operations comprising:
causing the extruder to print a test pattern based on a preset printing scheme, wherein the preset printing scheme specifies that the extruder moves at at least two movement speeds during extrusion of materials to print the test pattern;
detecting, using the detection device, an extrusion speed characteristic of the extruder from the test pattern; and
determining, based on the detected extrusion speed characteristic, a compensation coefficient for compensating an extrusion speed of the extruder,
wherein the test pattern extends along a predetermined path, and
wherein the detecting the extrusion speed characteristic of the extruder from the test pattern comprises detecting a cross-sectional characteristic representing a cross-sectional area of the test pattern on the predetermined path as the extrusion speed characteristic.

14. The medium of claim 13,
wherein the test pattern comprises at least one segment, and
wherein the preset printing scheme specifies that during printing of each segment, the extruder moves at a first movement speed of the at least two movement speeds for a first duration and moves at a second movement speed of the at least two movement speeds for a second duration immediately after the first duration.

15. The medium of claim 14,
wherein the at least one segment comprises a plurality of straight-line segments parallel to each other, and
wherein the causing the extruder to print the test pattern comprises:
during the printing of each straight-line segment:
moving the extruder at the first movement speed for the first duration to print a first sub-segment; and
moving the extruder at the second movement speed for the second duration to print a second sub-segment.

16. The medium of claim 15, wherein the determining the compensation coefficient for compensating the extrusion speed of the extruder comprises:
calculating a first sum of cross-sectional characteristics of all first sub-segments for at least one cross-section;
calculating a second sum of cross-sectional characteristics of all second sub-segments for at least one cross-section;
calculating a difference between the first sum and the second sum; and
calculating the compensation coefficient based at least in part on the difference, the first movement speed, the second movement speed, and a number of the plurality of straight-line segments.

17. The medium of claim 13,
wherein the preset printing scheme comprises a plurality of printing time periods, each printing time period comprising a plurality of consecutive printing cycles, each printing cycle being divided into a first duration and a second duration, and
wherein the preset printing scheme specifies that during each printing cycle, the extruder moves at a third movement speed of the at least two movement speeds for the first duration and moves at a fourth movement speed of the at least two movement speeds for the second duration.

18. The medium of claim 17, wherein the causing the extruder to print the test pattern comprises:
acquiring a plurality of compensation coefficient candidates corresponding to the plurality of printing time periods respectively;
for each compensation coefficient candidate:
compensating, using the compensation coefficient candidate, the extrusion speed of the extruder;
causing the extruder to move along a straight line at the third movement speed for the first duration during a printing time period corresponding to the compensation coefficient candidate to print a third sub-segment; and
causing the extruder to move along the straight line at the fourth movement speed for the second duration during the printing time period corresponding to the compensation coefficient candidate to print a fourth sub-segment.

* * * * *